Patented June 4, 1946

2,401,320

UNITED STATES PATENT OFFICE 2,401,320

METHOD OF TREATING CHEESE

George P. Sanders, Arlington, Va., dedicated to the free use of the People in the territory of the United States No Drawing. Application May 3, 1943,
Serial No. 485,460

3 Claims. (Cl. 99—199)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to a method of treating cheese, with particular reference to dehydration of cheese containing natural or added fats.

In the past it has been considered impossible by any direct procedure to dehydrate natural, fat-containing cheese, since, because of liquefaction of fat in the cheese when it is subjected to the elevated temperatures usually considered necessary for efficient dehydration, the rate of separation of the fat exceeds the rate of drying and fat exudes from the cheese. Certain dehydrating procedures previously used entail preliminary processing of the cheese, such as by adding aqueous liquid and usually a chemical emulsifier, and heating the material gradually while agitating it, usually followed by homogenizing it. These detailed steps have heretofore been considered necessary to reduce excessive fat losses in the product when it is dried, the drying usually being accomplished by a spraying process or by other processes requiring the use of high temperatures. According to other procedures, the cheese to be dehydrated is made from skimmed milk and the dehydrated product is mixed with butteroil, butter, or other fatty constituents in order to incorporate the fats. These several processes are indirect, and since they entail numerous operations, are costly. Moreover, volatile flavors are lost because of the high temperatures used.

The objects of this invention are to provide a method of dehydrating natural cheese containing fats without loss of the fats or the volatile flavors contained in the cheese, and such other objects as will be apparent from the following description and claims.

In general, the method is preferably effected by shredding the natural cheese into particularly thin shreds or fine particles which are then preliminarily dried with the particles substantially not in contact with each other and at a temperature near or below that at which the fat melts. During the preliminary drying, only an insignificant trace of fat exudes from the cheese particles, and the result is a formation of dried, hardened layers of cheese on the surfaces of the particles which entrap the fats and volatile flavors within the particles. Substantially, the only fat present on the surfaces is that which is normally contained in the surfaces themselves. The cheese can thereafter be agitated without the particles adhering and can be further dehydrated without loss of fat from the particles at any temperature incidental to efficient drying.

In effecting the preliminary drying, it is desirable that the surfaces be at least partially dried before the particles have an opportunity to contact each other and coalesce. This may be accomplished by allowing the comminuted particles to fall through a current of drying air directly as they leave the shredder, thus effecting relative motion between the particles and drying air. By this means the particles are substantially separate or out of contact with each other during the preliminary drying and the drying air contacts the surfaces of the particles, thus resulting in the formation of the dried, hardened layers on the surfaces of the particles.

To illustrate the process more specifically, natural full-fat cheese containing about 38 percent moisture may be shredded and distributed evenly in a layer on trays, screens, or smooth surfaces, in a strong current of air at about normal room temperature and humidity, preferably, however, at reduced humidity. Under these conditions of preliminary drying, the moisture content is reduced to about 33 percent during the interval of shredding. The moisture is removed very rapidly from the surfaces of the particles during this stage, and the particles, when then distributed on the trays, do not coalesce. The moisture content is further reduced to from about 8 to 12 percent in about 1 hour under normal conditions of temperature and humidity, and to about the same percent in about 30 minutes in case the air is partially dehumidified. During the time of preliminary drying, the surface-hardening effect occurs and thereafter the shredded cheese may be further dehydrated at any suitable and efficient temperature considerably above that of the melting point of the contained fat, without loss of the fat. A final dehydration at a temperature, preferably raised gradually, of about 145° F., in dry air for about 1½ hours to 2 hours, is sufficient to reduce the moisture content to less than 3 percent. The final temperature is preferably at least 145° F., because of the pasteurization effect thereby obtained. The dehydrated product can then be cooled to solidify the fat, flavoring and emulsifying materials may be added, if desired, and the product may be compressed into cakes and packaged in any suitable manner.

The maximum temperature of the drying gas at which the shredded cheese may be preliminarily dried is not defined sharply, since the melting range of fats varies. The temperature also depends on other factors which affect the rate of drying the surfaces of the particles, such as the nature and properties of the fat content in the cheese, the humidity conditions of the drying air or gas, the velocity of the gas stream, and the pressure of the gas. Also, the temperature of the cheese immediately before drying has an effect, since the internal temperature of the particles may be lower than the surfaces during the beginning of the drying, entailing a lag in the liquification of the fat, thus allowing a short interval of time of surface drying before warming and consequent liquefaction of the fat inside the particles occur. Therefore, preliminary storage of the cheese at a low temperature, for example, at 35° F. or even 50° F., aids in stabilizing the fat to prevent leakage during the preliminary drying. Also, the rapid evaporation occurring on the relatively large surface areas of the finely divided particles results in a cooling effect which retards liquefaction of the fat.

It has been found that the tendency of the fat to exude during dehydration is further decreased if the milk, or its fat-containing portion, is homogenized before the cheese is made, in which case it should also be pasteurized to prevent enzymatic reaction and accompanying bitterness resulting from the activation of the enzymes due to homogenization.

While the true melting points of most of the natural fatty acid components of cheese lie above 75° F., finely divided cheese particles shrink rapidly in the preliminary drying and fat tends to be exuded somewhat by pressure, if the temperature is so near the melting point that the fat is in a physical state of transition from a solid to a liquid. This necessitates a temperature of preliminary drying somewhat lower than would otherwise be required. The temperature should, however, be as high as possible to expedite the rate of drying without causing enough exuding of the fat to permit it to flow at all on the surfaces of the particles. By proper control of the various factors, such as by homogenizing the milk from which the cheese is made, dehumidifying the drying gas, drying in partial vacuum, initially chilling the cheese, shredding the particles very finely and, in particular, very thinly, and maintaining a maximum velocity of the drying air or gas, it is possible to effect the preliminary drying very rapidly at a temperature of the drying gas somewhat above the melting point of the fat without excessive, or even significant, exudation thereof, and without any measurable loss of fat in the finished product. For example, temperatures as high as 85° F. may be used very efficiently in drying natural cheeses containing normal amounts of milk fat. The preferable temperature range, however, is about from 60° F. to 80° F. Furthermore, the temperature may be increased gradually as the surfaces of the particles dry. If the fats contained in the cheese have a higher melting point than that indicated above, the preliminary drying temperature can be increased correspondingly.

The preliminary drying can be carried out with any type of equipment which will properly circulate the drying gas at the desired temperature in contact with the shredded cheese. For example, the cheese may be shredded and allowed to fall from the shredder to cover loosely the bottom of the trays to a depth of about ½ inch, or about ½ pound per square foot, the trays and shredder being located in a strong current of air from an electric fan in a room under conditions of normal temperature (72° F.). The use of special equipment making optimum conditions possible would, of course, shorten the time required for the preliminary drying. Final drying can be effected with any well-known type of dehydrator and the optimum temperature effect for the most effective and efficient drying is attained when the temperature is increased gradually during the final dehydration.

The saving in weight and space for storage and shipping purposes following from this invention is an obvious advantage. Cheese containing 38 percent moisture can be dehydrated to contain about 3 percent moisture in a period of from 2 to 3 hours, or somewhat less under favorably controlled conditions, with a corresponding saving in weight of about 35 percent. When the dried particles are compressed, for example, with a pressure of from 500 pounds to 2,000 pounds per square inch for 5 ounce portions, the specific gravity is the same or slightly greater than that of the original cheese, and the volume is decreased by about 35 to 36 percent.

Due to the manner of shredding and drying the cheese, there are additional advantages. Lots of cheese of varying properties and quality may be mixed intimately to produce a cheese of uniform quality. Natural cheese with high flavor score but with low body, texture and appearance scores may be used to the best possible advantage, since body, texture and appearance are of little consequence when the cheese is dehydrated in accordance with this process. Subsequent deterioration in the quality is prevented because, in the process, the types of decomposition and spoilage occurring in the natural cheese are arrested by removal of the moisture, and the final temperature and dehydration further arrest the activities of micro-organisms. The trimmings and non-edible rind portions remaining from blocks of cheese prior to grating can be dehydrated and preserved by this process with the saving of their fat contents, thus rendering them available in highly concentrated form for feed purposes.

According to the purpose desired, the dehydrated product may be subjected to additional treatments pertinent to the invention. After dehydration of the particles, about 1 to 2 percent of sodium citrate or a suitable amount of any other emulsifier may be mixed in them to improve the emulsifying properties for reconstituting the cheese. Also, about 0.005 percent of biacetyl or starter distillate, or a suitable amount of any desired flavoring material, including common salt, may be mixed in, to intensify the flavor and aroma. The dried particles, with or without any such added materials, may then be pressed into blocks and the blocks may be coated with paraffin, cheese wax, or any coating material intended to maintain the form of the block, to resist the passage of air, moisture and fat, and to prevent contamination.

Later, whether in the form of flakes, powder, or compressed cheese, and preferably with the above-mentioned emulsifier mixed in, the product may be mixed with water in the proportions of about 1 pound of dried cheese to ⅔ pound of water, and by heating gradually to approximately 150° F. while stirring, it may be reconstituted into a cheese of excellent slicing properties.

Having thus described the invention, what is claimed is:

1. In a method of dehydrating natural, fat-containing cheese, finely shredding the natural, fat-containing cheese, preliminarily effecting relative motion between a drying gas and the finely shredded particles of cheese with the particles substantially not in contact with each other and at a temperature of the drying gas not exceeding about 85° F. but below that at which excessive quantities of the fat exude from the surfaces of the particles during the dehydrating, thereby drying and hardening the surfaces of the particles and entrapping the fat within them, and then further drying the particles at a temperature considerably above that of the melting point of the contained fat.

2. In a method of dehydrating natural full-fat cheese, finely shredding the natural full-fat cheese, preliminarily effecting relative motion between a drying gas and the finely shredded particles of cheese with the particles substantially not in contact with each other and at a temperature of the drying gas not exceeding about 85° F. but below that at which excessive quantities of the fat exude from the surfaces of the particles during the dehydrating, thereby drying and hardening the surfaces of the particles and entrapping the fat within them, and then further progressively drying the particles at a temperature gradually increased to a final temperature of at least 145° F.

3. In a method of dehydrating natural, fat-containing cheese, finely shredding the natural, fat-containing cheese, preliminarily effecting relative motion between a drying gas and the finely shredded particles of cheese with the particles substantially not in contact with each other and at a temperature of the drying gas of from 60° F. to 80° F. but below that at which excessive quantities of the fat exude from the surfaces of the particles during the dehydrating, thereby drying and hardening the surfaces of the particles and entrapping the fat within them, and then further progressively drying the particles at a temperature gradually increased to a final temperature of at least 145° F.

GEORGE P. SANDERS.